United States Patent [19]

Hofmann

[11] 4,154,427

[45] May 15, 1979

[54] RATCHET DEVICE FOR BELTS OR ROPES

[75] Inventor: Ludwig Hofmann, Bühl, Fed. Rep. of Germany

[73] Assignee: Ludhof-Technik, Bühl, Fed. Rep. of Germany

[21] Appl. No.: 894,301

[22] Filed: Apr. 7, 1978

[30] Foreign Application Priority Data

Apr. 19, 1977 [DE] Fed. Rep. of Germany ....... 2717157

[51] Int. Cl.² .............................................. B66F 3/00
[52] U.S. Cl. ................................. 254/79; 24/68 CD; 24/71.2; 254/164
[58] Field of Search ................ 24/68 CD, 68 R, 71.2; 254/55, 73, 79, 51, 164, 169

[56] References Cited

U.S. PATENT DOCUMENTS

| 2,889,136 | 6/1959 | Prete, Jr. ...................... 254/79 X |
| 3,180,623 | 4/1965 | Huber ............................ 24/71.2 X |
| 3,749,366 | 7/1973 | Brucker ........................... 254/164 |

*Primary Examiner*—Philip C. Kannan
*Attorney, Agent, or Firm*—Allison C. Collard; Thomas M. Galgano

[57] ABSTRACT

A ratchet device is provided for tensioning belts or ropes which are used to secure piece goods during transport by means of trucks, ships, airplanes, etc. The device includes a ratchet housing, a belt tensioning assembly supported in the housing and a manually actuated pivotable lever for actuating the belt tensioning device. The device permits easy and facile adjustment of the belt tension by repeated pivot movements of the lever.

9 Claims, 4 Drawing Figures

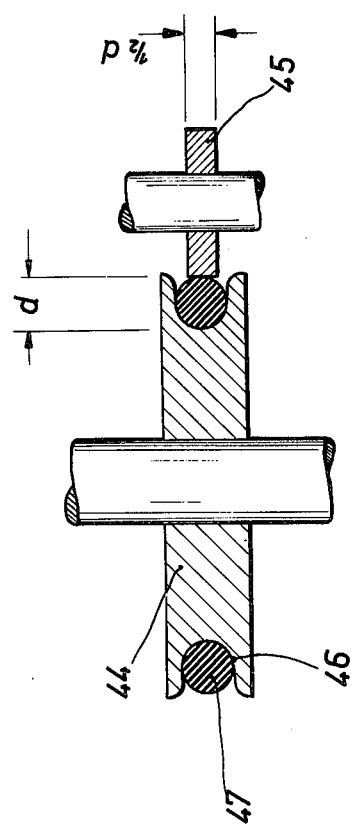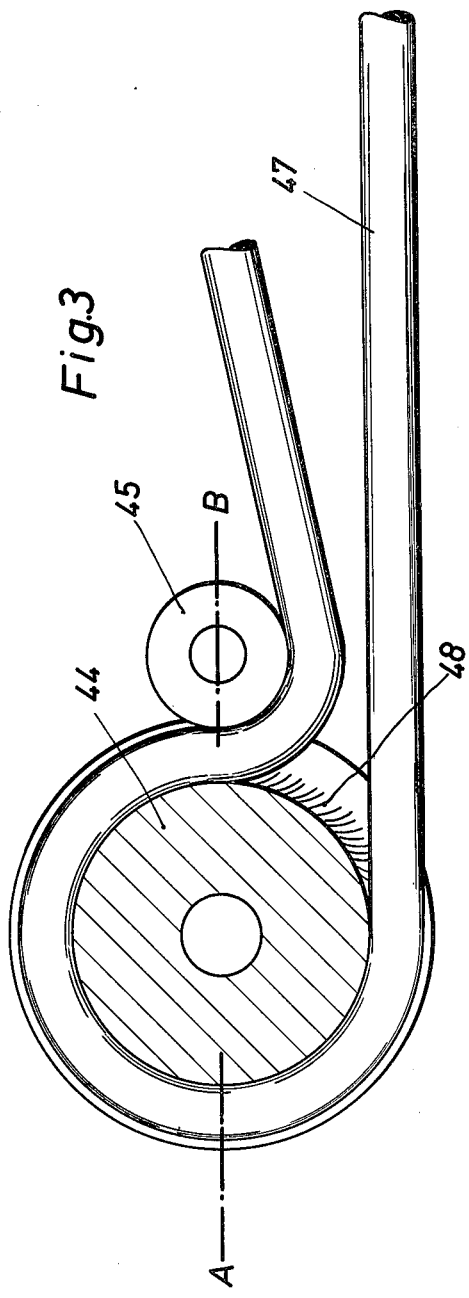

RATCHET DEVICE FOR BELTS OR ROPES

The present invention relates to a belt or rope ratchet device for clamping belts or ropes, respectively. More particularly, it relates to such a device which is specifically intended for clamping belts or ropes used to secure piece goods which are transported by means of trucks, ships, airplanes, etc.

A ratchet device for clamping such belts is known which, for example, may be mounted at one side of a loading platform. This ratchet device is provided with a slotted shaft which is rotatably mounted in a housing, the cross-section of the slot of which and the belt used are about equal dimension. One of the ends of the belt is pulled through the slot and is provided with a thickened portion at one end preventing an accidental pulling out of the belt from the slot. The other end of the belt is provided with a hook or a D-ring and can be attached on a complementary, corresponding clamping means on the opposite side of the loading platform. A further belt may be attached on a connecting rib of the housing which received the slotted shaft, and this further belt may be attached to a different place or the same place of the above-mentioned side of the loading platform by means of a hook or D-ring.

The piece good to be secured is positioned beneath the belt loop, which, during clamping or tensioning of the belt system, rigidly engages the piece good due to the activation of the ratchet means, so that the piece good is securely mounted on the loading platform.

The belt which is thickened on one end is first pulled manually through the slot of the shaft and is thereby pretensioned. The further tensioning of the belt is carried out in that the slotted shaft is turned by about 90° by means of a manual lever, whereby the belt winds around the inlet and outlet openings of the slot in a double layer, thus positively locking itself in position.

During the rotating movement of the slotted shaft or during the pivoting of the manual lever, respectively, a spring-loaded pawl engages the tooth of a sprocket which is coupled with the slotted shaft and arrests the shaft against a return movement. Thereby, the obtained belt tension is maintained when the manual lever moves back into its starting position engaging one of the teeth flanks of the sprocket. The lever is also coupled with a spring-loaded cam, so that further tensioning procedures may be affected by pivoting the manual lever.

For releasing the belt tension, the cam of the manual lever which engages one of the sprocket flanks or teeth during tensioning may be radially removed at any position and can also be lifted over an abutment, so that the manual lever may be moved by about 180°. During the pivot movement of the lever and between about 90° and about 180° position, a cam of the manual lever moves the pawl from the sprocket wheel, so that the previously wound belt roller may unwind under the previously-obtained belt tension.

As previously mentioned, the ratchet device may be installed between two belt portions, whereby at each end of these belt portions a hook or ring is provided for attachment to the loading platform. One of the belt portions is mounted on the ratchet housing, for example, on a rib of the housing, while the other free end is mounted in the slot of the shaft, as above described.

However, the known ratchet system has disadvantages which limit its use considerably. The belts for clamping the piece goods have a certain elasticity, which is also true for some piece goods and loading platforms.

In particular, one disadvantage when using long belts is that the wound-up roll of the belt during tensioning reaches such a large cross-section that it fills the ratchet housing without maintaining the desired tensioning of the belt. Consequently, the belt must be rewound and must again be pulled through the slotted shaft.

Rolls of wound-up belts may become too large in their cross-section, as a result of which they can get stuck during the release operation and retain the belt tension, so that the belt system can be wound back only with considerable difficulty. The thicker the belt roller, the more unfavorable is the lever ratio between manual lever and roller radius, which very often results in not obtaining the desired end tension, because the maximum available manual force for actuating the required torque cannot be obtained.

When employed in trucks, it is very common that the tension of the belts must be checked only after a short driving distance. Very often the load shifts or collapses due to rocking motion during the driving, so that the belt loses its tension and grip on the piece goods. A subsequent tensioning with the known ratchet device is only possible if the belt roller was not too thick before starting the trip.

If the roller of the belt is too thick, the ratchet device has to be released and the tensioning procedure has to be started all over again, hoping that during the winding of the belt enough space remains in the housing to receive the wound belt roll. The hitherto known ratchet devices of the above-mentioned type can only receive a belt of approximately 0.5 to 0.8 m. However, these values usually are not sufficient in actual practice.

It is, therefore, an object of the present invention to eliminate the disadvantages of the hitherto known ratchet devices and provide a ratchet device of the aforementioned type, wherein the total available belt can be retracted by repeated pivot movements of the pivot lever and can be brought to the desired tension.

In order to achieve this object of the invention, a belt or rope ratchet device for tensioning belts or ropes, respectively, is provided for securing piece goods in place, which includes a ratchet housing for receiving the belt-tensioning device and for mounting the manually-actuated lever for actuating the belt-tensioning device and for locking the belt or rope. One end piece of the belt or rope in the ratchet housing encompasses a drive shaft or roller which is arrestably and rotatably mounting in longitudinally-elongated apertures of the ratchet housing and which is mounted for longitudinally displaceable movement in front of, and against, a supporting shaft or roller mounted in the housing. The drive shaft or roller is actuated by means of a known ratchet device, for example, a sprocket wheel which is rotated on the axle of drive shaft or roller, and a pawl. A manually actuated pivotable lever is provided with release cams for releasing the pawl from engagement with the sprocket wheel, and a release gripper having a cam member which engages the teeth of the sprocket wheel. A cam disc is also provided having an abutment for the cam member of the release gripper as well as a groove for arresting the cam member in the free-running position of the manual lever.

In accordance with a particular embodiment of the invention, the surface of the drive shaft may be knurled, have longitudinal grooves or may have a rubber layer, so as to generate a very high friction coefficient on the shaft or roller circumference. The surface of the support roller or shaft may also be provided with a friction coefficient increasing surface, for example, a rubber layer.

The belt or rope ratchet device in accordance with the invention achieves numerous advantages in contrast to the hitherto known ratchet devices. No limits are set for the length of the shortened and tensioned belt loops, so that even elastic piece goods can be securely clamped. Should a subsequent tensioning be required after a short drive, it can be accomplished by merely actuating the lever.

Finally, the ratio between the manual lever and the belt rewinding mechanism remains always even when moving the ratchet during the tensioning procedures.

Other objects and features of the present invention will become apparent from the following detailed description when taken in connection with the accompanying drawings which discloses several embodiments of the invention. It is to be understood that the drawings are designed for the purpose of illustration only, and are not intended as a definition of the limits and scope of the invention disclosed.

In the drawings, wherein similar reference numerals denote similar elements throughout the several views:

FIG. 3 is a side view of a drive roller and an associated supporting roller when using a rope ratchet device in accordance with the present invention; and FIG. 4 is a sectional view, in part elevational, taken along lines A–B of FIG. 3.

Figure 1:
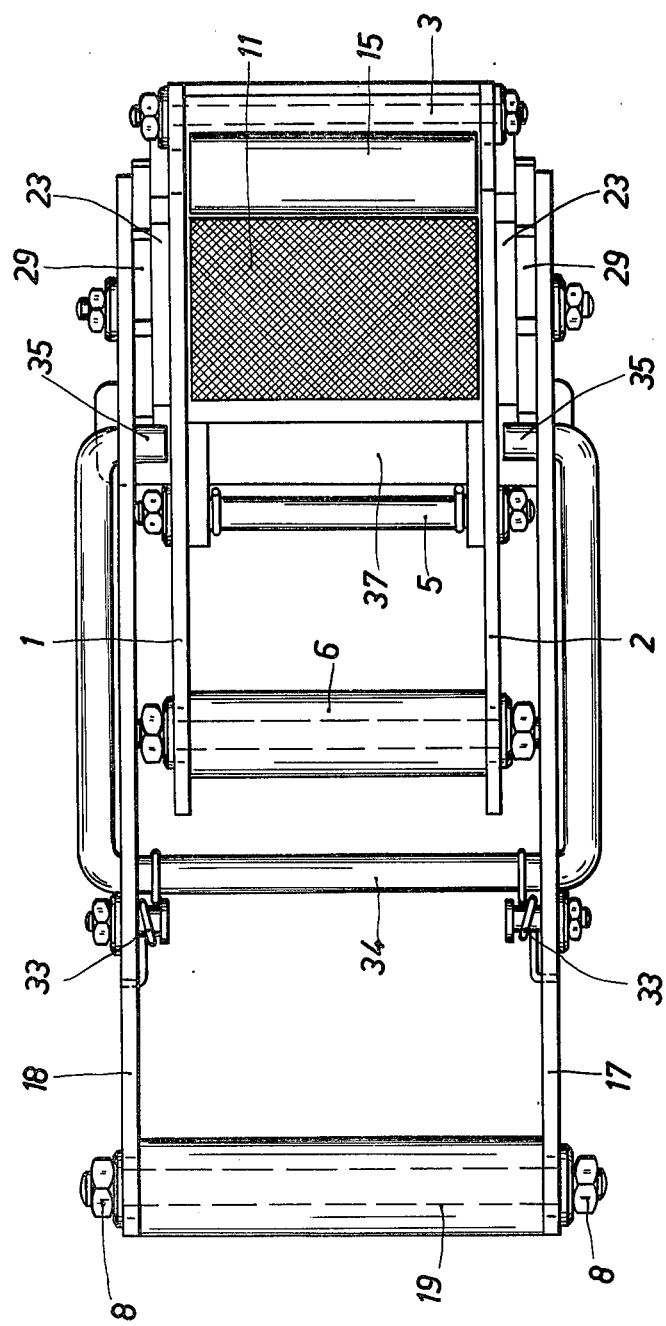
FIG. 1 is a plan view of one embodiment of the belt or rope ratchet device made in accordance with the present invention.
Figure 2:
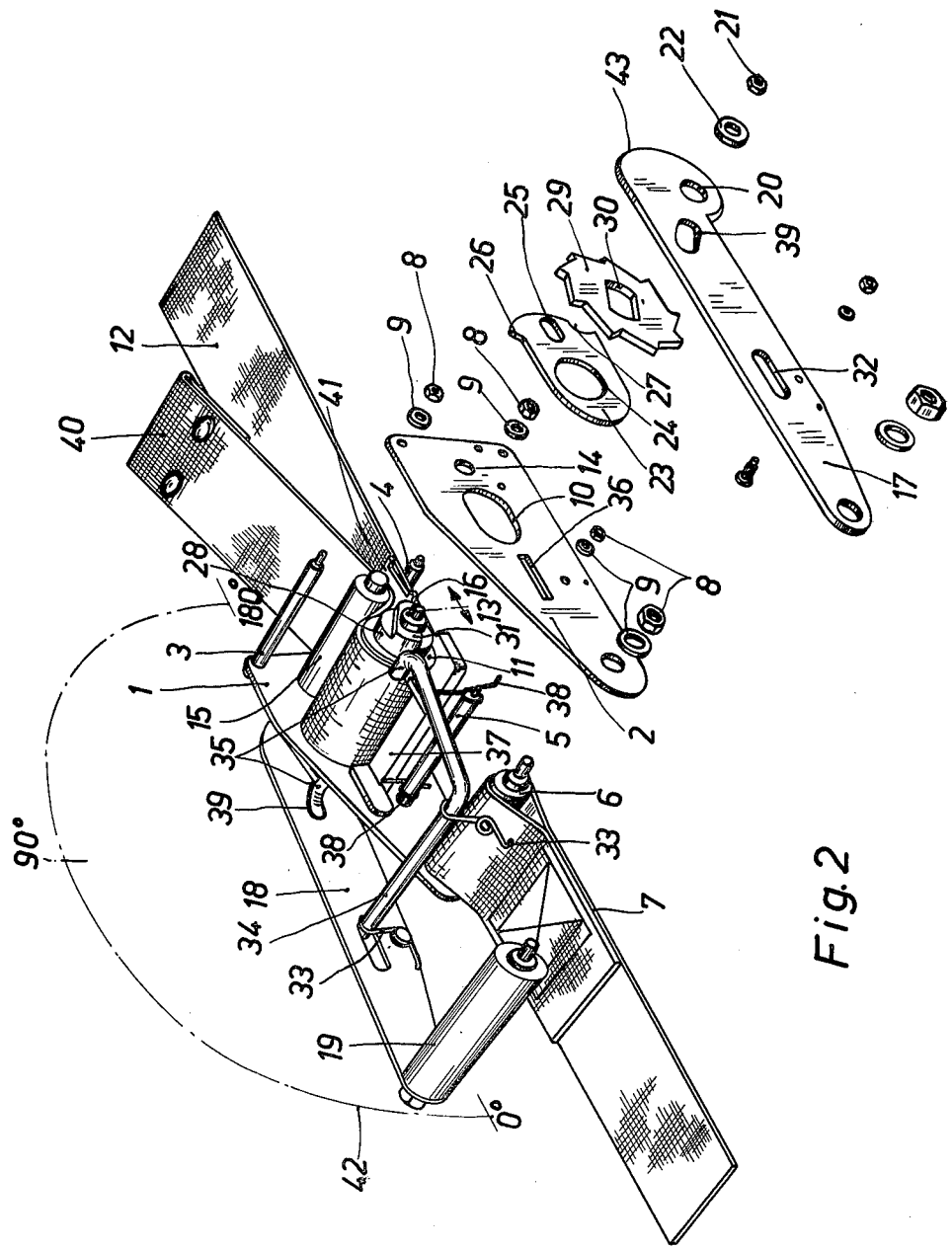
FIG. 2 is a perspective view, partially exploded, of the ratchet device shown in FIG. 1.

Referring now in detail to the drawings, the belt ratchet shown in FIGS. 1 and 2, which is used, in particular, for securing piece goods in transport vehicles essentially includes a ratchet housing having two side walls 1 and 2, which are joined together by means of distance rollers 3, 4, and 5 and a receiving roller 6, the latter of which has received thereon the end piece 7 of a belt. The housing and associated rollers are screwed together with screws 8 and washers 9.

A drive roller or shaft 11 is rotatably mounted in longitudinally-elongated slots 10 provided in side walls 1 and 2 and is longitudinally displaceable therein, in the direction of double arrow 13. Furthermore, a supporting roller 15 is rotatably mounted in the bores 14 of side walls 1 and 2, against which drive roller 11 is displaceably movable as mentioned above.

In order to carry out the ratchet movements, a manually-actuated lever consisting of two side faces 17 and 18, and a connecting rib 19 is mounted on the stepped shaft portions 16 of drive roller 11; stepped shaft portions 16 being pivotably mounted in bores 20 of side faces 17 and 18, and each is held in place by nut 21 and disc 22. A cam disc 23 having a circular bore 24 and a longitudinally-elongated aperture 25 formed therethrough is provided between each of the side faces 17 and 18 of the manually-actuated lever and side walls 1 and 2. Each of the cam discs 23 is provided with a cam 26 and a groove 27 and is mounted on the stepped or offset shoulder 28 of shaft 11 for effecting a longitudinal displacement of drive shaft 11.

Furthermore, a sprocket wheel 29 having a longitudinally-elongated aperture 30 is mounted adjacent to each of the cam discs 30. Each of the sprocket wheels 29 is mounted on the offset shoulder 31 of drive shaft 11 and acts to rotate drive shaft 11. A generally U-shaped release gripper 34 is slidably mounted in longitudinally-elongated slots 32 of the two lever sides 17 and 18 and is held under tension by springs 33; gripper 34 is longitudinally moveable in slots 32 for effecting rotation of drive roller 11. At its front ends, the release gripper 34 is provided with cams 35 which engage a tooth of sprocket wheels 29 arranged at both sides of the lever when pivoting the lever 17, 18, 19 around its axis and thereby actuating the drive shaft 11 into rotating movement. An arresting member or pawl 37 which is under tension of a spring 38 is slideably mounted between side walls 1 and 2 of the ratchet housing. Arresting member 37 prevents a counterclockwise movement of driving shaft 11 during the return movement of belt end 12, because the front ends of arresting member 37 engage the corresponding teeth of sprocket wheels 29.

In order to assure the kinetic guiding of release gripper 34 with cams 35, a sickle-shaped bore 39 is provided in side faces 17 and 18. A separating wall 41 is provided in the ratchet housing for the incoming and outgoing end pieces 12 and 40 of the belt which move between rollers 11 and 15. This separating wall 41 prevents belt end 40 which runs out from drive roller 11 from sliding into incoming belt 12 and causing interference in operation.

The belt or rope ratchet device as shown in FIGS. 1 and 2 operates as follows:

End piece 12 of the belt, which preferably is fed from below, is wrapped around drive shaft 11 encompassing about 270° of its circumferential surface and is pressed against support shaft 15 by means of arresting springs 38 and exits as upper end piece 40. Drive roller 11, as a result of its displaceable mounting in apertures 10, permits the use of belts of different thicknesses and permits the two rollers to be pushed-apart during the free-running position of the manual lever.

Hence, the clamped belt between the drive roller 11 and the support roller 15 can freely and loosely run into the ratchet device and can be provided with a manual pretension. In this manner, the belt can be moved powerlessly in a reciprocating movement whereby the two rollers rotate, so that the required length adjustment can be taken care of.

As shown in FIG. 2, for actuating the ratchet movement, lever 17, 18, 19 is pivoted from its resting position, in the direction of the dotted semicircle 42, over an arc of about 90°, which, in turn, causes the cams 35 of release gripper 34 to rotate sprocket wheels 29 and thereby drive roller 11 in a clockwise rotation until cams 35 engage cams 26 of cam discs 23. In this position, sprocket wheels 29 are arrested by arresting member 37.

When the lever means moves back into the rest position and resumes the aforementioned movement, a friction starts to build up at the places of the drive roller 11 which is encompassed by the belt and also between the two rollers 11, 15, which is large enough so as to provide the desired pretension to the belt. Thereby, drive roller 11 is pushed against the supporting roller 15 in correspondence with the tension in the belt end 12 in an ever increasing pressure, so that a sliding of the belt between the two rollers is prevented.

In order to release the tension, release gripper 34 is pulled against the force of springs 33 and the lever is pivoted from any given position by about 180° corresponding to circular segment 42. Thereby, cams 35 which engage the cams 26 of cam discs 23 and the corresponding teeth of sprocket wheels 29 are released and are pivoted above the two discs until they engage the lower grooves 27 of cam discs 23. Thereby arresting member 37 is moved to the left from the shown position in FIG. 2 by cam surfaces 43, which are provided on side walls 17 and 18, until sprocket wheels 29 and drive shaft 11 can freely rotate. In this free running position of the manual lever, both rollers 11 and 15 are freely rotatable in both directions, so that for an advanced longitudinal adjustment, belt ends 12 or 40 may be pulled in a reciprocable manner between rollers 11 and 15. During a renewal tensioning, belt end 40 is pulled manually until a certain pretension is obtained. At this point, manual lever 17, 18, 19 is moved back into the rest position by retracting the release gripper 34, thus releasing cam 35 from groove 27. Subsequently, the renewed tensioning procedure may be repeated by the aforementioned ratchet movements. It should be noted that drive roller 11 has a larger cross-section than support roller 15. In this way, drive roller 11 can be wrapped with a rather large belt piece for building a corresponding friction. Furthermore, the incoming and outgoing belt portions 12, 40 at support roller 15 permits the feeding of the belt onto the drive roller without the use of return rollers. Finally, the support roller may be provided with a rubber layer which flattens under pressure, to a certain extent, resulting in a flat-like contact face between the belt and the support roller. Furthermore, the upper side of the pawl 37 lies in a plane which runs through the center point of the two rollers 11 and 15, so that the springs 38 of the pawl are fully effective. Finally, the ratchet may be somewhat offset with respect to the roller arrangement, so that the layer between the drive roller and the longitudinal aperture in the housing receives relief.

As can be seen from FIGS. 3 and 4, a drive pulley or roller 44 with an associated support roller 45 may be used as a rope ratchet device and placed into a corresponding ratchet housing, instead of drive roller 11 and support roller 15. Thereby, drive pulley 44 is provided with a circumferential groove 46 which corresponds to the cross-section of rope 47. A milling or grooving 48 is provided on the inside of the groove 46. This milling or grooving increases the friction. Support roller 44 has a width which corresponds to about 50% of the rope cross-section. This prevents a jamming of the rope between the groove flanks of drive pulley 44 and support roller 45.

In the illustrated embodiments, the housing and the lever are assembled by means of screws and distance rollers. Naturally, other suitable arrangements can be made whereby the screws are replaced by rivets. Finally, the two side faces 17 and 18 of the lever may be made of a unitary piece of material. The distance rollers can be coupled with the side walls or other structural elements by means of ribs or other structural elements.

While only a few embodiments of the present invention have been shown and described, it will be obvious to those persons of ordinary skill in the art that many changes and modifications may be made thereunto without departing from the spirit and scope of the invention.

What is claimed is:

1. A ratchet device for tensioning belts and ropes and the like comprising:

a ratchet housing having two spaced-apart side walls, each of which has a longitudinally-elongated aperture formed therein;
   a supporting roller rotatably supported between said sidewalls of said housing;
   a drive roller having a drive shaft which is rotatably supported in said apertures of said side walls and being longitudinally displaceable therein for coaction with said supporting roller;
   means for securing one end of a belt or rope to said ratchet housing;
   a ratchet and pawl assembly for rotating and arresting rotatable movement of said drive roller, said assembly including at least one sprocket wheel mounted on said drive shaft of said drive roller and a spring-loaded pawl slideably supported on said ratchet housing for reciprocating movement between an engaging and release position relative to the teeth of said sprocket wheel;
   a manually-actuated lever pivotably mounted on said ratchet housing, said lever including a release gripper having a release handle and at least one cam member secured thereto which engages the teeth of said sprocket wheel and which, upon pivoting of said lever, effects rotation of said sprocket wheel and drive roller; and
   at least one cam disc which is supported adjacent to said sprocket wheel member having an abutment formed on the peripheral surface thereon against which said cam member of said release gripper is movable to limit pivotable movement of said lever and having a groove formed in the peripheral surface thereof in which said cam member is receivable for arresting the cam in a free-running position of said manual lever.

2. The ratchet device according to claim 1, wherein said drive roller is provided with a friction-enhancing surface.

3. The ratchet device according to claim 1, wherein said support roller is provided with a friction enhancing surface.

4. The ratchet device according to claim 1, wherein said drive roller has a larger diameter than said support roller.

5. The ratchet device according to claim 1, wherein said lever includes two spaced-apart side walls, one end of each of which is pivotably supported on said side walls of said ratchet housing, said lever side walls each having an elongated longitudinally-extending slot formed therein, and wherein said release handle of said lever is spring loaded and is slideably mounted in said slots of said lever side walls for movement between a release position and an engagement position, in the latter position of which it urges said cam member thereof against the teeth of said sprocket wheel and against the peripheral surface of said cam disc.

6. The ratchet device according to claim 5, wherein said lever is pivotable over an arc of approximately 180°, between a 0° rest position and a 180° free-running position, wherein upon pivoting of said lever over an arc of approximately 90°, said lever will effect partial rotation of said drive roller until said cam member thereof engages said abutment member of said cam disc, wherein following movement of said release handle to said release position said lever may be pivoted into said 180° position thereof, in which position said cam thereof is received with said groove of said cam disc, and wherein said pivotably-supported ends of said sidewalls of said lever are each provided with cam surfaces which, when said lever is in said 180° position thereof, engage and release said pawl from engagement with the teeth of said sprocket wheel so as to, in turn, permit free rotation of said drive roller.

7. The ratchet according to claim 1, wherein said ratchet housing includes a separating wall disposed between said side walls thereof which is provided for the incoming and outgoing belt end portions fed around said drive and supporting rollers.

8. The ratchet device according to claim 1 in combination with a rope and wherein said drive roller is provided with a circumferentially-extending groove having a cross-section which corresponds to the cross-section of said rope and wherein said support roller has a width which corresponds to about 50% of the cross-section of said rope.

9. The ratchet device according to claim 1, wherein said groove of said drive roller is provided with a friction-enhancing surface.

* * * * *

UNITED STATES PATENT OFFICE
CERTIFICATE OF CORRECTION

Patent No. 4,154,427　　　　　　　　　Dated May 15, 1979

Inventor(s) LUDWIG HOFMANN

It is certified that error appears in the above-identified patent and that said Letters Patent are hereby corrected as shown below:

Claim 9, line 1, delete the reference numeral "1" and substitute therefor --8--.

Signed and Sealed this

*Twenty-fifth* Day of *September 1979*

[SEAL]

*Attest:*

*Attesting Officer*　　　　LUTRELLE F. PARKER
　　　　　　　　　　　　　*Acting Commissioner of Patents and Trademarks*